United States Patent [19]

Salomon

[11] Patent Number: 5,150,448
[45] Date of Patent: Sep. 22, 1992

[54] BEVERAGE FLOW HEATER UTILIZING HEATED TUBE WITH DISCRETE HEATING ZONE

[75] Inventor: Thomas Salomon, Schloss Holte, Fed. Rep. of Germany

[73] Assignee: Melitta Haushalts-Produkte GmbH & Co., KG, Minden, Fed. Rep. of Germany

[21] Appl. No.: 628,355

[22] Filed: Dec. 17, 1990

[30] Foreign Application Priority Data

Dec. 15, 1989 [DE] Fed. Rep. of Germany ....... 3941476

[51] Int. Cl.⁵ ........................ F24H 1/12; A47J 31/54
[52] U.S. Cl. ................................ 392/480; 392/397; 392/472; 99/288
[58] Field of Search ................. 392/480–481, 392/467, 478, 472, 397, 398; 122/9; 432/29; 222/146.5; 99/279–300

[56] References Cited

U.S. PATENT DOCUMENTS

| | | | |
|---|---|---|---|
| 1,190,289 | 7/1916 | Herz | 392/481 |
| 1,480,907 | 1/1924 | Hewitt | 392/472 |
| 1,995,302 | 3/1935 | Goldstein | 392/472 |
| 2,507,464 | 5/1950 | So | 392/395 |
| 2,680,802 | 6/1954 | Bremer et al. | 392/321 |
| 4,352,007 | 9/1982 | Baker et al. | 219/522 |
| 4,547,656 | 10/1985 | Swiatosz et al. | 392/397 |

FOREIGN PATENT DOCUMENTS

| | | |
|---|---|---|
| 0162958 | 12/1985 | European Pat. Off. |
| 2757109 | 6/1979 | Fed. Rep. of Germany ...... 392/457 |
| 8905005 | 7/1989 | Fed. Rep. of Germany |
| 2241760 | 3/1975 | France |
| 8101610 | 11/1982 | Netherlands ........................ 99/288 |
| 1151214 | 5/1969 | United Kingdom |
| 2062823 | 5/1981 | United Kingdom |

*Primary Examiner*—Bruce A. Reynolds
*Assistant Examiner*—John A. Jeffery
*Attorney, Agent, or Firm*—Spencer, Frank & Schneider

[57] ABSTRACT

A flow heater is provided for water in a machine which produces hot water. The machine includes a water tube having an inflow end for receiving water and an outflow end for dispensing hot water, and a heating tube connected to the water tube in a heat conductive manner. The heating tube is divided over its extent into a plurality of regions of different heating outputs for, respectively, intensely heating the water to below the boiling point in a first zone of the water tube adjacent the inflow end, followed by a less intense heating of the water to attain the boiling point in a second zone of the water tube, followed by an intense heating of the water until a vigorous formation of vapor bubbles occurs in a third zone of the water tube, and finally followed by a less intense heating of the water for reheating the water in a fourth zone of the water tube adjacent the outflow end.

18 Claims, 7 Drawing Sheets

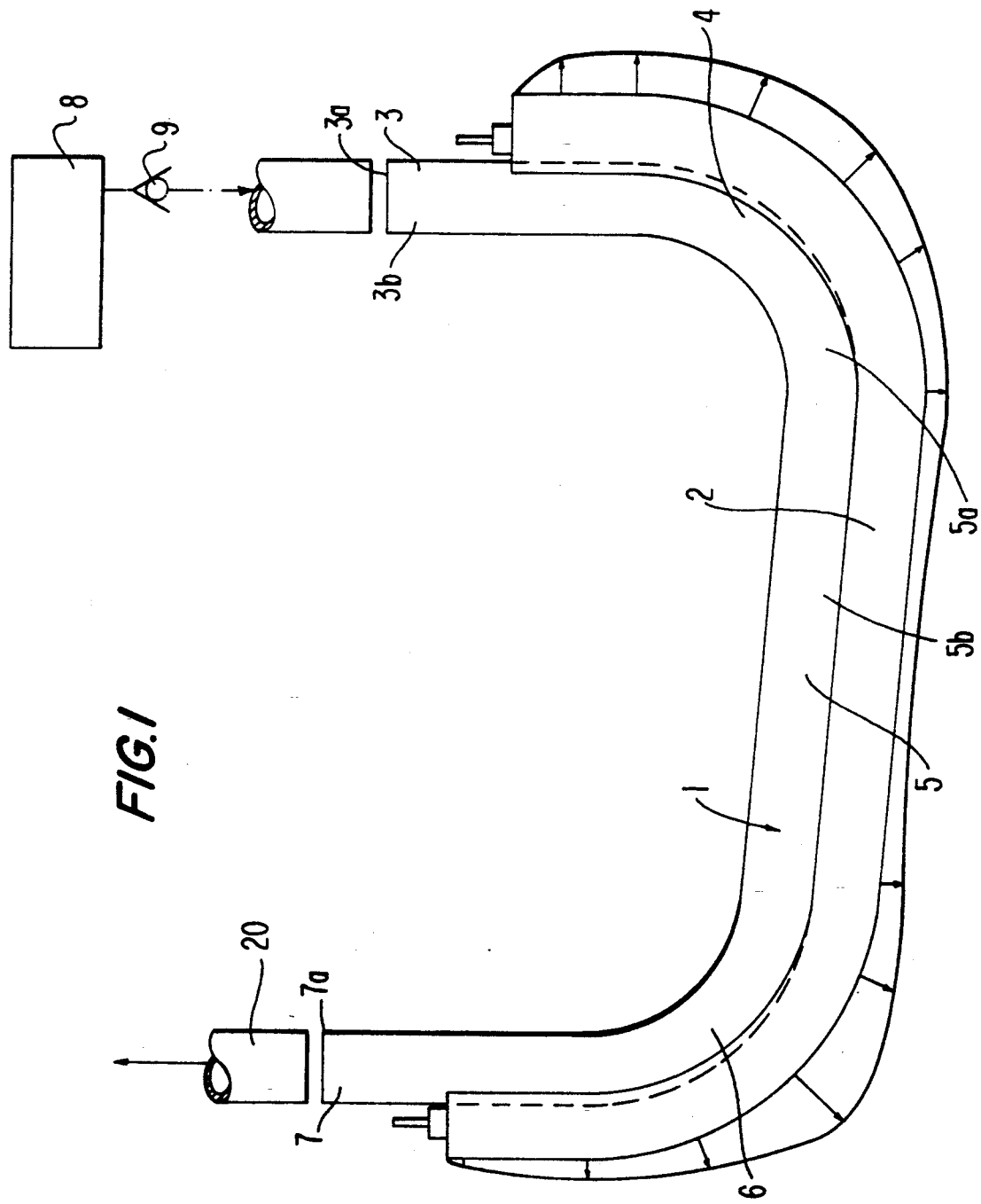

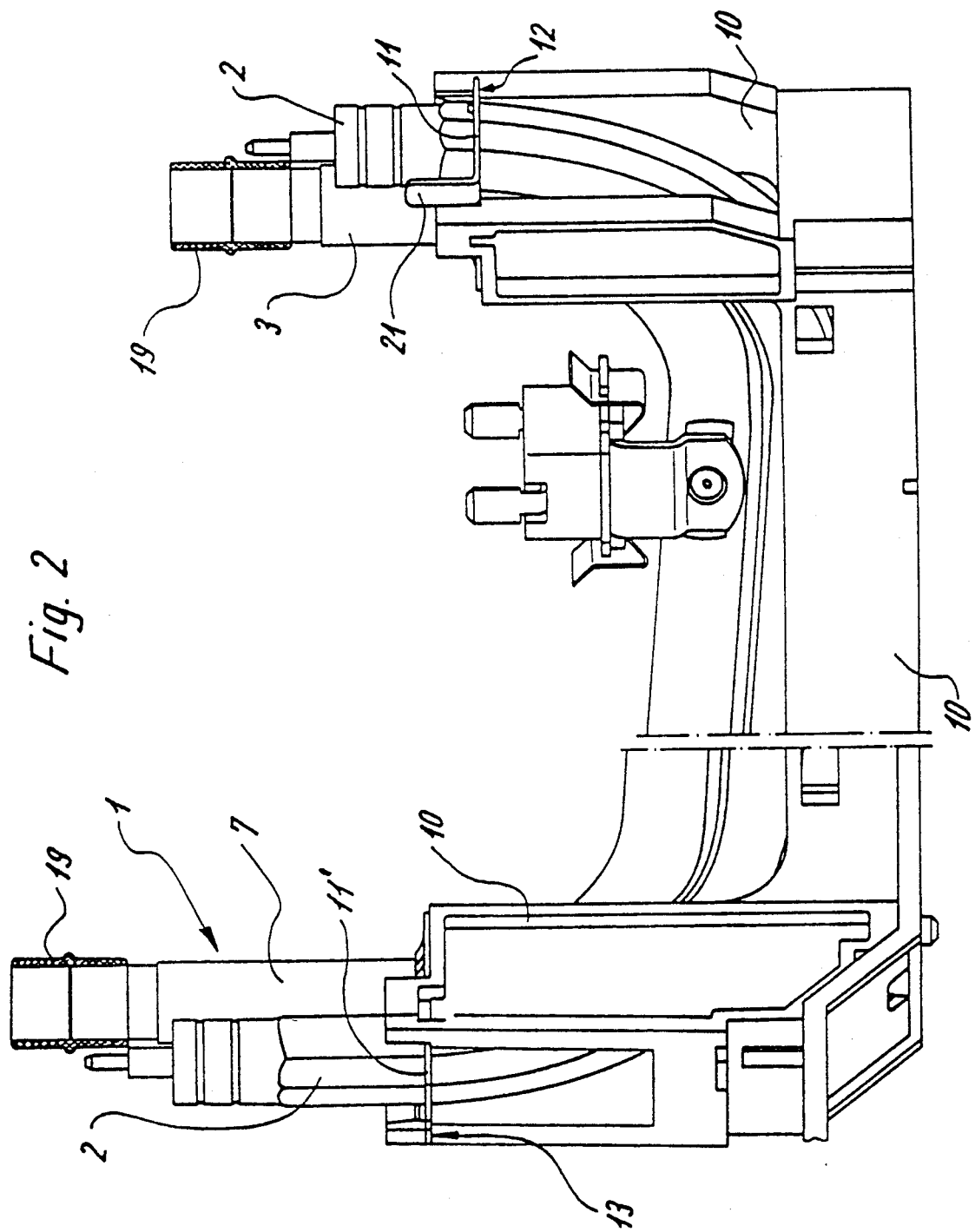

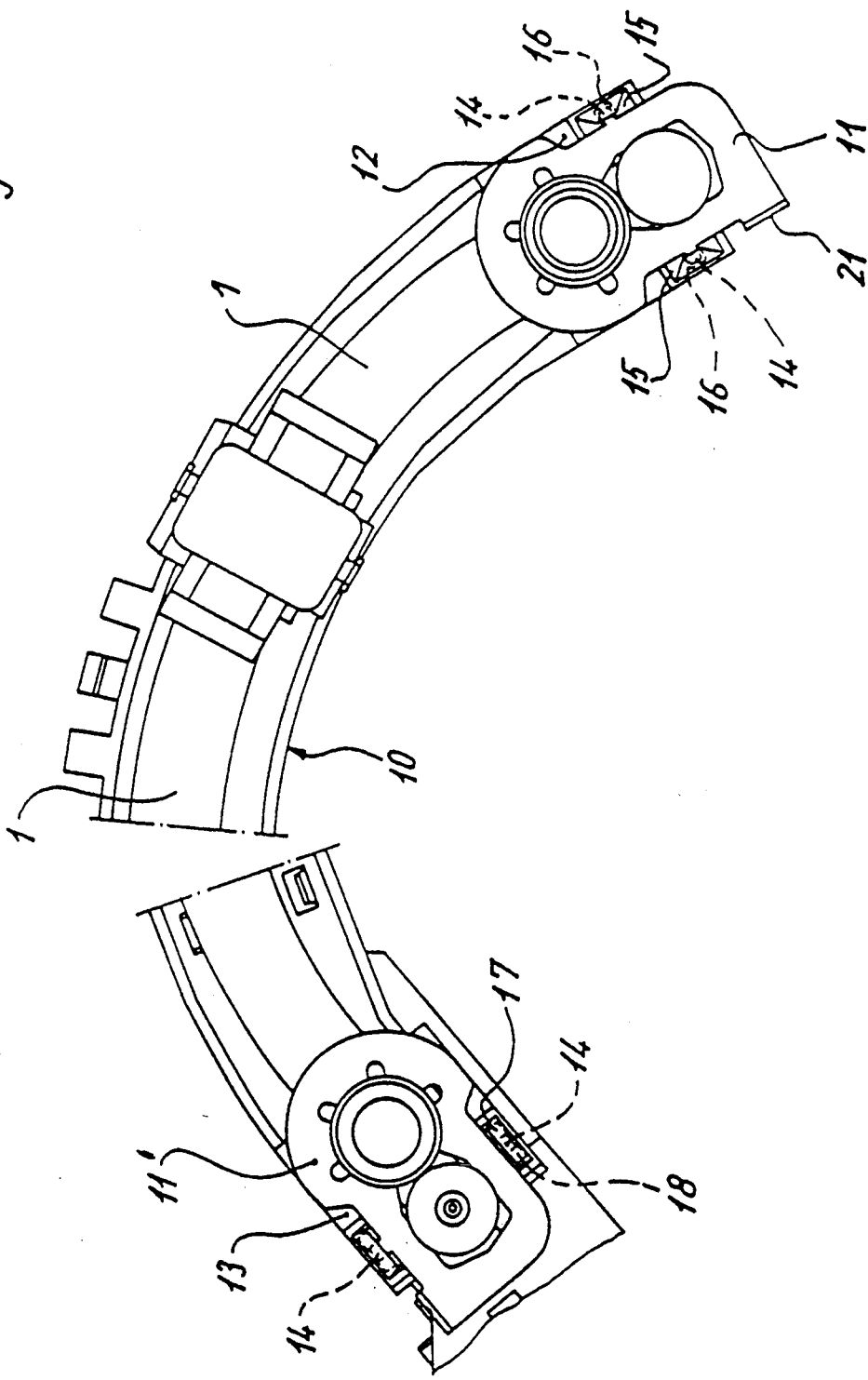

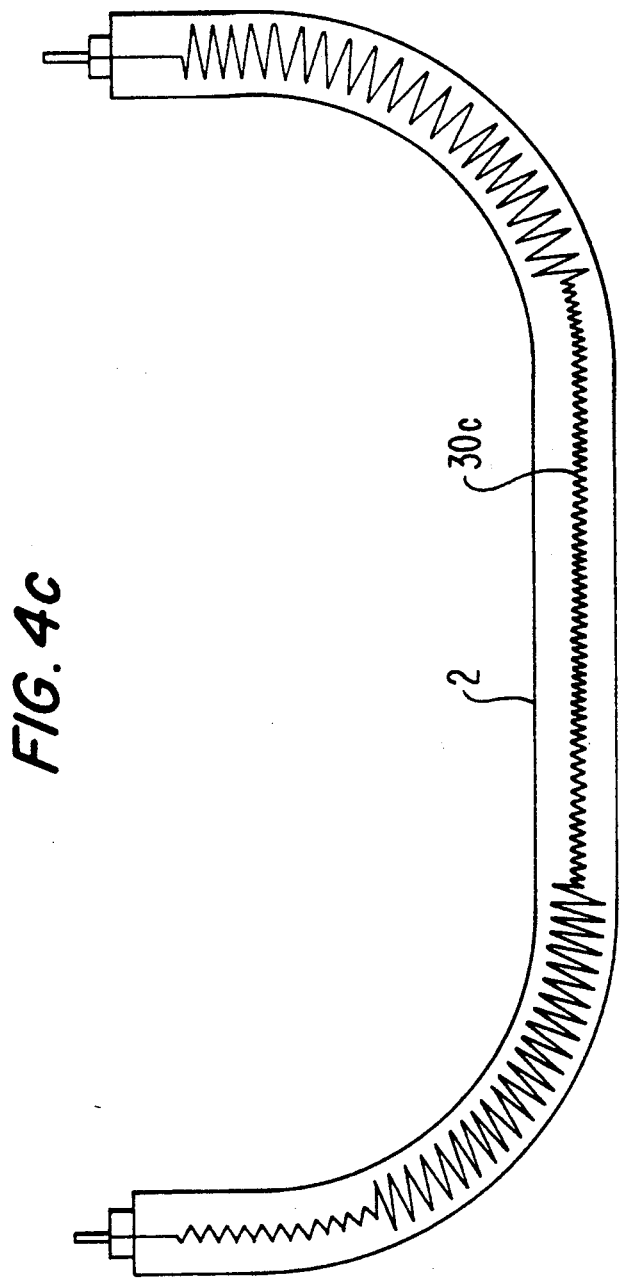

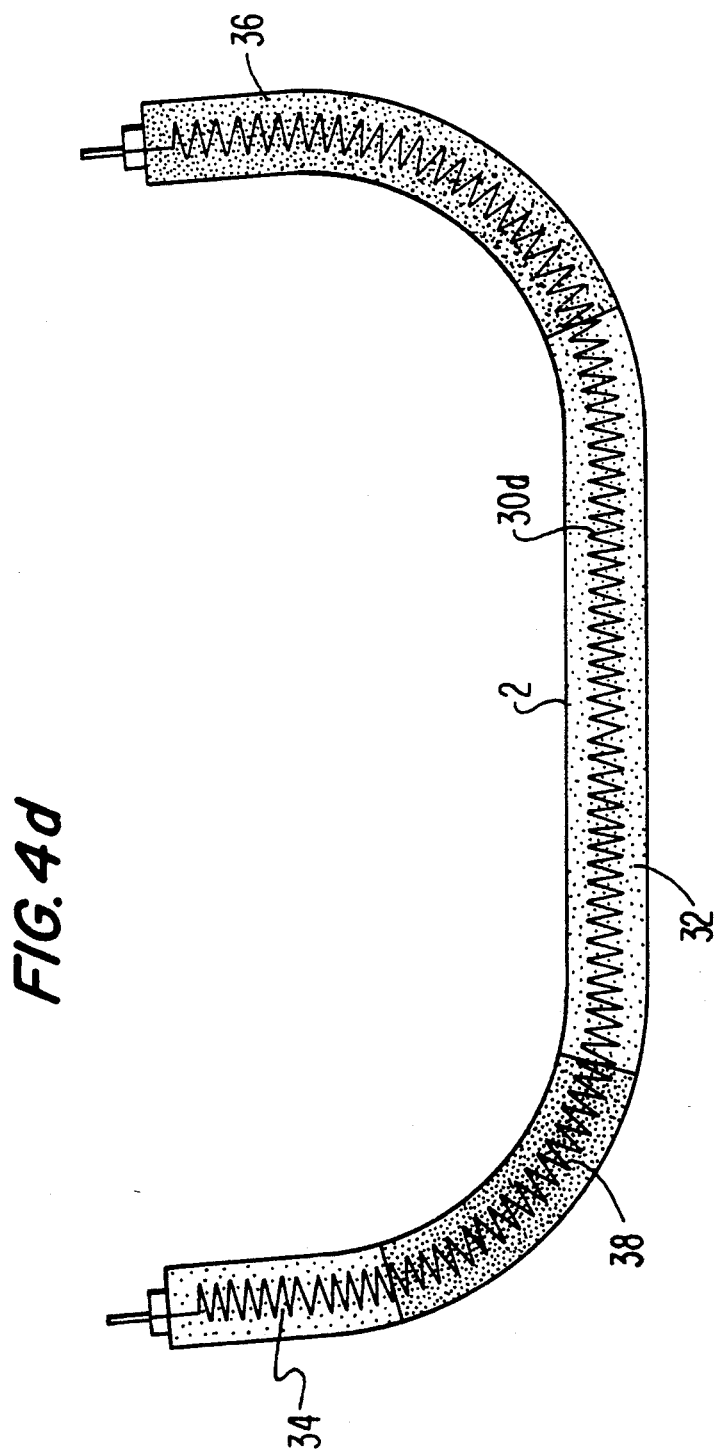

5,150,448

BEVERAGE FLOW HEATER UTILIZING HEATED TUBE WITH DISCRETE HEATING ZONE

CROSS REFERENCE TO RELATED APPLICATIONS

The present application claims the rights of priority with respect to application Ser. No. P 39 41 476.0-16 filed Dec. 15th, 1989 in the Federal Republic of Germany, the subject matter of which is incorporated herein by reference.

BACKGROUND OF THE INVENTION

The invention relates a flow heater for water in a machine for producing hot water, and in particular for a machine for the preparation of brewed beverages. Such a machine includes a water tube and a heating tube connected to the water tube in a heat conductive manner.

Prior art flow heaters of this type have until now been designed so that the heating tube over its entire length along the water tube has a uniform heating output. This is counterproductive toward an optimal degree of effectiveness, and it results in a high exposure to heat of the housing elements usually found in the vicinity of the heating and water tubes. The geometric shape of the water tube and, therefore, of the heating tube as well as the conrresponding spatial arrangement within the housing have, until now, been designed according to the geometric conditions of the respective housings rather than the optimalization of the operational process and heating efficiency.

SUMMARY OF THE INVENTION

It is therefore an object of the present invention to produce a flow heater of the foregoing type which demonstrates a markedly improved efficiency with respect to the heating of the water as well as with respect to the transport of water.

The above and other objects are accomplished in the context a flow heater for water in a macnine which produces hot water, the machine including a water tube having an inflow end for receiving water and an outflow end for dispensing hot water, and a heating tube connnected to the water tube in a heat conductive manner, wherein according to the invention the heating tube is divided over its extent into a plurality of regions of different heating outputs for, respectively, intensely heating the water to below the boiling point in a first zone of the water tube adjacent the inflow end, followed by a less intense heating of the water to attain the boiling point in a second zone of the water tube, followed by an intense heating of the water until a vigorous formation of vapor bubbbles occurs in a third zone of the water tube, and finally followed by a less intense heating of the water for reheating the water in a fourth zone of the water tube adjacent the outflow end.

Thus, according to the invention, the incoming, cold water is relatively rapidly brought to a high temperature, which, nevertheless still remains below the boiling point. The considerable energy employed here is expended completely on heating the water. Formation of steam bubbles generally does not yet occur so that the surface pressure of the water tube in the first zone, despite the use of great energy, remains low even toward the end of the first zone.

The adjacent second zone operates on a lower input of energy and the water is brought to the boiling point. Thanks to this process, an overly strong formation of steam bubbles is not yet reached. The steam bubbles that are formed are still able to remove themselves from the wall of the water tube and are able to condense while giving off their intense heat. This results in the boiling temperature without excessive surface pressure on the tube section involved and, is due to very good heat transformation of the steam bubbles into the water at a relatively low use of energy heating the water.

In the third zone a rapid heating of the water takes place again until a vigorous formation of steam bubbles is reached. The transporting effect required for the flow heater is practically reached in this third zone. The steam bubbles form a strong current having a considerable pushing force. Due to this fact, the surface pressure of the tube remains again, at least in relation to the heating capacity employed, rather low. The only purpose of the fourth zone is to reheat the water which now exits the flow heater at the outflow end.

According to a preferred embodiment of the invention, the first zone constitutes an inflow section and includes a contiguous arch which changes into the second zone which is in the form of a curved tube section, as seen from a top view of the flow heater, having an initial level portion followed by a slightly upwardly sloping portion in the direction of the outflow end. The end region of the upwardly sloping portion of the second zone changes into the third zone which is in the form of an arch and which is connected to a vertical outflow section representing the fourth zone.

With this type of design and spatial arrangement of the mentioned sections of the water tube, the heating efficiency of the flow heater is significantly improved. The given shape and the configuration of space in the first zone is functionally not of extraordinary significance, because the water, even if initially heated relatively high, is generally considered still relatively cold.

However, the design of the second zone is essential wherein the initial portion of the curved tube section of the second zone is level at its lowermost portion and thereafter slopes slightly upward in the direction of outflow. Because the slight upward slope favors the extraordinary tendency for the steam bubbles forming on the wall of the water tube to detach themselves in the heating phase of the second zone, they enter the water to a greater extent and impart to it an intense heat. In this case, the movement of the steam bubbles occurs in an advantageous manner on account of the slight upward slope of the tube section, appropriately in the desired direction of transport, and therefore not backward into the region of the inflow, and in particular not toward a check valve which is generally disposed beteen the inflow end and a water storage tank.

Also essential is the vertical outflow section connected to the arch following the second zone. The vertical outflow section favors to an extraordinary degree the flow that occurs in this region under the effect of the bubbles which appear here to a considerable extent. The advancement of the flow at simultaneously low surface pressure on the weater tube is favored in particular by the vertical position of the outflow section insofar as the flow profile of the stream of vapor bubbles always forms toward the center of the tube, with a strong concentration of vapor bubbles occurring here and not on the tube wall. The heating efficiency is thus optimized because the measures indicated in the mentioned zones complement each other advantageously and reinforce each other.

It is also emphasized that the flow heater according to the invention works significantly less noisily in comparison to prior art flow heaters, because in the first zone no formation of vapor bubbles occurs at all, and in the second zone only relatively few vapor bubbles are formed and, for this reason, practically no vapor bubbles travel backwards toward the mentioned check valve.

In a preferred embodiment of the flow heater of the invention, the inflow section of the water tube is oriented in a vertical position. This has the advantage that the process for bending the water tube is performed more easily. Further, the mounting of the flow heater itself can be easily accomplished on a support provided on the side of the housing, and the end components of the flow heater, including the inflow section and the outflow section of the water tube, sealing elements and the like as well as the assembly of the entire housing can be accomplished in this region by means of a linear, easily automated assembly movement.

Additional aspects of the invention relate to practical embodiments of adjacent housing regions, in particular, supports for receiving and storing the water tube and heating tube in the desired spatial position as will be described in greater detail hereinbelow.

A preferred embodiment of a flow heater according to the invention will now be described in conjunction with the accompanying drawings.

BRIEF DESCRIPTION OF THE DRAWINGS

FIG. 1 is a side view of a water tube and heating tube of a flow heater according to the invention, illustrating the various heating zones of different heating outputs.

FIG. 2 is a partial side view of the flow heater according to the other invention including a receiving element for supporting the flow heater and the anchoring of the water and heating tubes in the receiving element.

FIG. 3 is a partial top view of the arrangement according to FIG. 2.

FIGS. 4a to 4d show different embodiments for implementing the heating tube of FIG. 1.

DETAILED DESCRIPTION OF THE PREFERRED EMBODIMENT

Figure 4A:
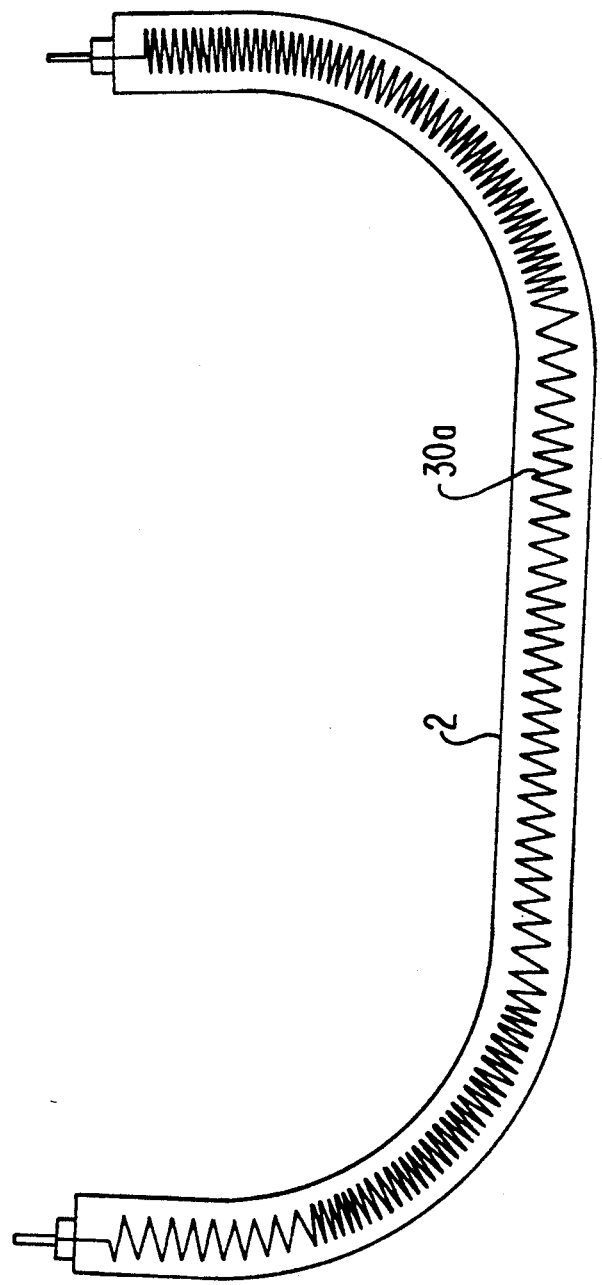

Referring to the drawings, there is shown a flow heater which comprises a water tube 1 connected in a heat conducting manner with a heating tube 2. Based on the geometric configuration of its shape, water tube 1, as seen from its inflow end 3a towards its outflow end 7a, has a first zone comprising an inflow section 3 including a vertically oriented portion 3b and a contiguous arch portion 4. Arch 4 changes into a second zone in the form of a tube section 5 having an initial level portion 5a, which is the lowermost portion of the water tube, followed by a slightly upwardly sloping portion 5b. The angle of incline in the direction of outflow of portion 5b may be, for example, approximately 5°.

In additrion, tube section 5 may, as can be seen in particular from FIG. 3, depending on the conditions of the housing, also be curved in the shape of an arch as viewed from the top of the flow heater. The end region of tube section 5 changes into a third zone in the form of an arched tube section 6 which transitions into a vertically oriented outflow section 7 of the water tube which constitutes a fourth zone. The geometry of heating tube 2 corresponds to that of water tube 1.

In addition to the design of the flow heater whose functional significance will be described in detail below, heating tube 2 has also, according to the invention, a differentiated heating output, which is illustrated in FIG. 1 by a curve 22 which extends beyond heating tube 2 to show the heating output of the different zones. A greater distance of curve 22 from heating tube 2 corresponds to a greater heating output.

As shown in FIG. 1, the following approximate different heating outputs have been assigned to heating tube 2 over its course from inflow section 3 to outflow section 7. In the first zone, approximately corresponding to the inflow section 3, including the vertical portion 3b and the first arch 4 of the water tube, heating tube 2 has a high heat output, so that the water tube there has a first zone of intense water heating, in which the incoming water is rapidly heated, but remains below the boiling point. The entire, considerable heating output in the first zone is concentrated on heating the water. In view of the fact that the water enters the water tube cold, the formation of vapor bubbles does not take place in the first zone.

It is noted that from an operational perspective, inflow section 3 may be positioned horizontally, although, as previously mentioned, the vertical orientation is more desirable from the standpoint of ease of assembly.

Following the first zone of heating tube 2 there is a further zone, of a relatively low heat output, corresponding approximately to the above described second zone of water tube 1, that is corresponding to the beginning of tube section 5, which has an intitial level portion 5a followed by a portion 5b which slopes slightly upward in the direction of the outflow, up to the end-region of the tube section 5. The water tube in the second zone thus has a relatively low supply of heat, which, however, is sufficient to heat the water in tube section 5 to the boiling point. The formation of vapor bubbles therefore starts in tube section 5, which naturally starts at the wall of the water tube opposite heating tube 2, more precisely, where tube section 5 begins. The heating effect accomplished here serves essentially only for heating the water to the boiling point, and this is accomplished with a great degree of efficiency, since due to the slight upward slope in the position of tube section 5 toward the outflow, the vapor bubbles have the inclination and tendency to immediately detach themselves from the tube wall, i.e., to enter into tube section 5 and there to emit intense heat by way of condensation, while, on the other hand, the specific surface pressure of the water tube itself remains low due to the rapid detachment of the vapor bubbles. One advantage is also that the onset of the slight movement of flow of the vapor bubbles proceeds in the desired direction of transport, i.e., toward outflow end 7a, and that this first, initial movement of vapor bubbles, in particular, is not backwards via the arch 4 toward inflow section 3.

As shown in FIG. 1, a brewing machine incorporating the flow heater according to the invention has a check value 9 between inflow section 3 and a water storage tank 8 also illustrated in FIG. 1. A particular advantage of the arrangement according to the invention is that check value 9 operates quietly because it is no longer under pressure from vapor bubbles. Further, the tendency for a built-up of a mineral and cork layer is significantly reduced.

Heating tube 2 is further provided with a third zone of high heat output following the second zone. The third zone of heating tube 2 corresponding to the above mentioned third zone of water tube 1 and thus starts from the end region of tube section 5 and extends to vertical outflow section 7, and thus relates, in particular, to the second arch section 6. In this third zone of intensive water heating a strong formation of vapor bubbles occurs accomplishing the required transport performance for the flow heater. Following the third heating zone is an adjacent, fourth zone of low heating output disposed along vertical outflow section 7 where as much heat is supplied as is required for reheating the water.

Because the vapor bubbles always travel into a region of strongest flow, the vertical orientation of outflow section 7 causes within it a flow having a flow profile such that the vapor bubbles migrate to the center of the tube. This helps to obtain the desired transport capacity as well as good heat condition in outflow section 7 so that a relatively small supply of energy will make it possible to accomplish the reheating process. Additionally, the specific surface pressure of the water tube also remains relatively low in outflow section 7.

The division of heating tube 2 into regions of different heating output, on the one hand, and the described geometric design of the water tube, on the other hand, when considered separately, each contribute a considerable improvement in the heating efficiency of the flow heater. If these measures are combined, heating efficiency is optimized.

For reasons mentioned above, the flow heater operates noiselessly, and in addition the surrounding elements in the housing of the machine device provided with the inventive flow heater are subjected to a relatively low heat load.

According to a further aspect of the invention, the flow heater, which is essentially comprised of water tube 1 and heating tube 2, additionally includes a receiving element 10 which serves to provide the desired spatial position to the tubes and to securely support the tubes as shown in FIGS. 2 and 3. Receiving element 10 further functions as thermal insulation with respect to adjacent side walls of the housing and other functioning elements of the machine, and for this reason appropriately comprises a plastic material which has appropriate insulating characteristics.

Because inflow section 3 and outflow section 7 are in a vertical orientation in space, according to the preferred embodiment, a relatively simple manufacturing process in connection with the bending of tubes 1 and 2 is permitted and it is further possible to carry out essential assembly steps both for the flow heater and the elements to be connected to it in a linear assembly movement, which considerably simplifies automatic assembly. The structural components described below and their respective design contribute to the realization of this type of simple assembly.

Referring to FIGS. 2 and 3, there is shown a first holding clamp 11 clamped over vertical inflow section 3 of water tube 1 and the corresponding vertical section of the heating tube 2, respectively, and a second holding clamp 11' clamped over vertical outflow section 7 of water tube 1 and the corresponding section of heating tube 2. The two holding clamps 11 and 11' are, in relation to one another, at identical heights on the inflow side and the outflow side of the flow heater. Receiving element 10 is provided in its respective end regions with supports 12 and 13 for supporting counterpart surface regions of holding clamps 11 and 11', respectively. Additionally, holding clamps 11 and 11' each have locking brackets 14 on two opposite sides, respectively.

Receiving element 10 is provided with hooks 15 in the region of support 12 on the inflow side below which holding clamp 11 can be engaged with a vertical assembly movement. Fitted receptacles 16 for the locking brackets 14 of holding clamp 11 are arranged in the hooks 15. In this manner, in the region of the inflow side of the flow heater, a fixed bearing is produced between tubes 1 and 2 and the receiving element 10, which itself may be appropriately attached to the housing. This fixed bearing is the control point for the assembly movements and is appropriately located where the flow heater is relatively cold.

On support 13 on the outflow side of receiving element 10, hooks 17 are arranged below which holding clamp 11' can be snapped in with a vertical assembly movement. The hooks 17 have receptacles 18 for receiving locking brackets 14 with play in accordance with a moveable bearing, so that temperature expansions of the flow heater in operation in relation to its receiving element can be accommodated without any difficulties.

As shown in FIG. 2, tight fitting sealing connections 19 are disposed on the upper free end of inflow section 3 and outflow section 7 of water tube 1, respectively. An ascending tube 20 (FIG. 1) can be inserted into sealing connection 19 on the outflow side, again, with a vertical assembly movement. Thanks to this design, it is possible to place practically the entire upper portion of the housing, for example, of a machine for the preparation of brewed beverages, pre-assembled onto a pre-assembled base. Because the defined fixed bearing on the inflow side makes possible a precision assembly line, a water supply tube, coming from the water storage tank 8 (FIG. 1), can here be inserted directly onto sealing connection 19 within the framework of an automatic assembly movement.

The ascending tube, which must be kept flexible, can subsequently be connected to a hot-water dispenser inasmuch as one can operate in this assembly phase without a hose.

According to a further advantageous feature of the invention, an additional function can be assigned to the holding clamps 11 and 11'. If they are made of an electrically conductive metal, they can, for example, simultaneously serve as ground connections by means of a curved bracket 21 which is adapted for attachment to a ground lead.

Figure 4B:
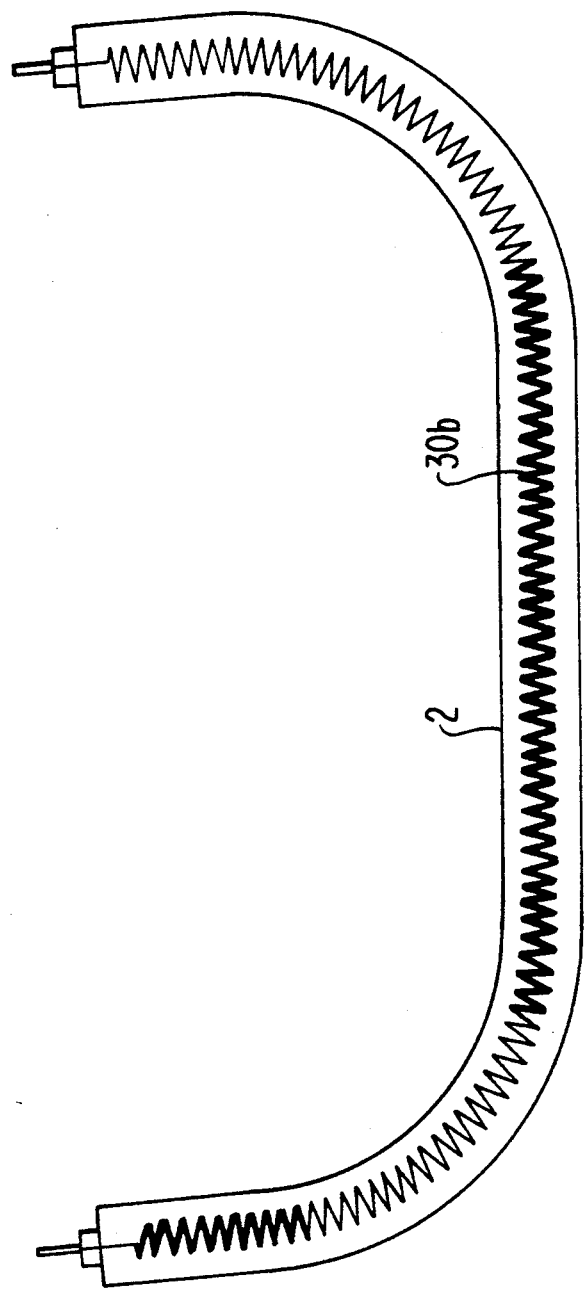

The regions of different heating output over the course of heating tube 2, as described earlier, can be realized in different ways. According to one embodiment, the heating tube comprises a helical heating coil 30a and the pitch of the turns of the coil is varied from one region to another to effect the different heating outputs as shown in FIG. 4a. In another embodiment the helical heating coil wire 30b itself is given different diameters corresponding to the desired heating output as shown in FIG. 4b. In a further embodiment, shown in FIG. 4c the diameter of the heating coil 30c is varied from one region to another to effect the respective heating outputs. It should be obvious that combinations of the foregoing measures may be employed to achieve the different heating outputs.

In yet another embodiment, shown in FIG. 4c the different heating outputs may be obtained by using a heating coil 30d of constant pitch, constant wire diameter and constant coil diameter, and by filling the heating tube section by section with materials having different heat conductivity, for example, with a ceramic material modified in different ways with respect to heat conductivity. These types of filling materials are compressed due to the deformation of the outer tube. It is also possible, as specifically shown in FIG. 4d, to obtain different heat conductivities in different regions by compressing the filling materials to different degrees in the respective regions for example, a low degree of compression in sections 32 and 34 and a high degree of compression in sections 36 and 38.

Obviously, numerous and additional modifications and variations of the present invention are possible in light of the above teachings. It is therefore to be understood that within the scope of the appended claims, the invention may be practiced otherwise than as specifically claimed.

What is claimed is:

1. In a flow heater for water in a machine which produces hot water, the machine including a water tube having an inflow end for receiving water and an outflow end for dispensing hot water, and a heating tube connected to the water tube in a heat conductive manner, the improvement wherein said heating tube is divided over its extent into a plurality of regions of different heating outputs, respectively, for intensely heating the water to below the boiling point in a first zone of the water tube adjacent the inflow end, followed by a less intense heating of the water to attain the boiling point in a second zone of the water tube, followed by an intense heating of the water until a vigorous formation of vapor bubbles occurs in a third zone of the water tube, and finally followed by a less intense heating of the water for reheating the water in a fourth zone of the water tube adjacent the outflow end.

2. Flow heater according to claim 1, wherein said heating tube comprises a heating coil and the pitch of the turns of the coil is varied from one region to another to effect the different heating outputs.

3. Flow heater according to claim 1, wherein the first zone constitutes a water inflow section for receiving water from the inflow end and includes a contiguous arch portion which changes into the second zone, the second zone being in the form of a tube section which is curved as seen from a top view of the flow heater and which has an initial level portion followed by a portion that slopes slightly upward in the direction of the outflow end followed by an end portion that changes into the third zone, the third zone comprising an arch section which changes into the fourth zone, the fourth zone comprising a vertical tube section constituting an outflow section for delivering heated water to the outflow end.

4. Flow heater according to claim 3, wherein the inflow section has a vertically oriented portion between the inflow end and the contiguous arch portion.

5. Flow heater according to claim 3, wherein the upwardly sloping portion of the tube section of the second zone has a slope of approximately 5°.

6. Flow heater according to claim 4, and further comprising a receiving means for supporting the water tube and the heating tube and securing means for securely fastening the vertically oriented portion of the inflow section and the vertical tube section of the outflow section to the receiving means.

7. Flow heater according to claim 6, wherein the receiving means comprises a thermal insulating plastic material.

8. Flow heater according to claim 6, wherein said receiving means includes an inflow side and an outflow side and said securing means comprises a first holding clamp fixed to the inflow section of the water tube and to a corresponding section of the heating tube, a second holding clamp fixed at the same height as the first holding clamp to the outflow section of the water tube and a corresponding section of the heating tube, and mounting means for mounting the first and second clamps on the inflow and outflow sides, respectively, of the receiving means.

9. Flow heater according to claim 8, wherein said mounting means includes a fixed bearing for fixing the first holding clamp to the receiving means on the inflow side and a movable bearing for movably mounting the second holding clamp to the receiving means on the outflow side.

10. Flow heater according to claim 9, wherein said fixed bearing includes a supporting surface on the inflow side of the receiving means for supporting a countersurface of the first holding clamp, locking brackets projecting laterally from the first holding clamp, a receptacle provided in the inflow side of the receiving means for tightly receiving the locking brackets, and hooks provided on the receiving means for engaging and snapping in the first holding clamp.

11. Flow heater according claim 9, wherein the movable bearing includes a supporting surface on the outflow side of the receiving means for supporting a countersurface of the second holding clamp, locking brackets projecting laterally from the second holding clamp, a receptacle provided on the outflow side of the receiving means for receiving the locking brackets with play, and hooks provided on the receiving means for engaging and snapping in the second holding clamp.

12. Flow heater according to claim 8, wherein at least one of said holding clamps comprises electrically conductive material and has a connecting bracket for attaching an electrical lead.

13. Flow heater according to claim 1, and further comprising two tightly fitting sealing connections each disposed on a respective one of the inflow end and the outflow end of the water tube.

14. Flow heater according to claim 1, wherein said heating tube comprises a wire heating coil and the diameter of the wire in the turns of the coil is varied from one region to another to effect the different heating output.

15. Flow heater according to claim 1, wherein said heating tube comprises a heating coil and the diameter of the turns of the coil are varied from one region to another to effect the different heating outputs.

16. Flow heater according to claim 1, wherein said heating tube includes material of different heat conductivity filling the respective regions of the heating tube to effect the different heating outputs.

17. Flow heater according to claim 16, wherein the material filling the heating tube comprises ceramic material modified in the respective regions of the heating tube to give the ceramic material different heat transfer characteristics in the respective region of the heating tube.

18. Flow heater according to claim 16, wherein the material filling the heating tube comprises ceramic material which is compressed to a different degree in the respective regions of the heating tube.

* * * * *